July 18, 1967　　　　　A. HARMENS　　　　　3,331,213
PROCESS FOR THE SEPARATION OF GASEOUS MIXTURES EMPLOYING A
PRODUCT AS REFRIGERANT
Filed March 10, 1965

INVENTOR
Alexander Harmens

BY Max L. Libman

ATTORNEY

United States Patent Office 3,331,213
Patented July 18, 1967

3,331,213
PROCESS FOR THE SEPARATION OF GASEOUS MIXTURES EMPLOYING A PRODUCT AS REFRIGERANT
Alexander Harmens, Purley, England, assignor to Conch International Methane Limited, Nassau, Bahamas, a Bahamian company
Filed Mar. 10, 1965, Ser. No. 438,562
Claims priority, application Great Britain, June 17, 1964, 25,081/64
7 Claims. (Cl. 62—18)

This invention relates to a process for the separation of gaseous mixtures, especially to the separation of helium from nitrogen.

The separation of the helium-nitrogen binary is usually the final stage of processes for the recovery of helium from natural gas or air, and the process of the present invention can be used for this separation, provided the raw helium-nitrogen mixture is available at a low temperature and elevated pressure.

According to the present invention, a gaseous feed mixture available at a low temperature and at an elevated pressure, is separated into two components having widely different boiling points by a process in which the feed mixture is at least partially condensed in a first indirect heat exchange step and phase separated in a first separator vessel, the gas from the first separator vessel is compressed and at least partially condensed in a second indirect heat exchange step and phase separated in a second separator vessel, liquid from the second separator vessel is used as refrigerant in said second indirect heat exchange step where it vaporizes, and the vaporized refrigerant after being compressed is also fed back to the first separator vessel, the higher boiling component is obtained as a liquid from the first separator vessel and is used as refrigerant in said first indirect heat exchange step and the lower boiling component is obtained as a gas from the second separator vessel.

This process which relies on a substantial enrichment of the components before the separation steps in the separation vessels is only efficiently used when the components have widely different boiling points, e.g., at least 50° C. Thus, helium having a boiling point of −268.9° C. is separated from nitrogen having a boiling point of −195.8° C., and hydrogen having a boiling point of −252.8° C. is separated from the carbon monoxide (boiling point −191.5° C.) present in producer gas. Of course, components having closer boiling points can be separated by repeating the process of this invention in more than two separation stages so that more than two separations in separator vessels takes place. In this case the process would be more involved and for this reason a difference in boiling points of at least 50° C. is preferred. The gaseous feed mixture must be available at a low temperature and at an elevated pressure, and should preferably be in the saturated condition so that the condensation in the first indirect heat exchange step is readily achieved. If the feed mixture is not however in the saturated condition then its temperature must be low enough and its pressure high enough so that the liquefied and compressed component of higher boiling point obtained from the first separator vessel can cause the condensation of the feed mixture in the first indirect heat exchange step. A convenient feed stream is the gaseous nitrogen obtained from the distillation column in at least one other known process which is not per se a part of the present invention.

In the first indirect heat exchange step, the feed mixture instead of being partially condensed in the heat exchanger itself can, if desired, be completely condensed in the heat exchanger and then expanded, e.g., through a throttle valve, into the first separator vessel. This complete condensation followed by expansion is advantageous when the feed mixture is at high pressure.

The gas from the first separator vessel after being compressed can be cooled in one or more indirect heat exchange steps before it is at least partially condensed in the second indirect heat exchange step. Thus, it may be cooled in an intermediate indirect heat exchange step by the higher boiling component after it has been separated as a liquid from the first separator vessel and after it has evaporated (when acting as refrigerant) in the first indirect heat exchange step.

In another indirect heat exchange step, this gas from the first separator vessel after being compressed, can also be cooled in the heat exchanger of the first indirect heat exchange step, where preferably it partially condenses.

In the second indirect heat exchange step, the gaseous component from the first separator (which may already be partially condensed) is cooled so that it is partially condensed, and is preferably almost completely condensed (e.g., for a nitrogen and helium mixture, condenses by at least 98 mol %). Alternatively, of course, in this second indirect heat exchange step, the gas from the first separator vessel can be completely condensed and thereafter expanded, e.g., in a throttle valve, before it is phase separated in the second separator vessel. This alternative procedure however would generally require more energy as the gas will require much compression before it could be completely condensed in the second heat exchange step, and for this reason it may not be the preferred procedure in many cases. In the second separator vessel, phase separation occurs and the lower-boiling component is obtained as a gas therefrom.

The liquid higher boiling component obtained from the first separator vessel may be compressed before being used as refrigerant in the first indirect heat exchange step. In the first heat-exchanger, generally most of the liquid will evaporate, and before being delivered as the higher-boiling component it can also be used as gaseous refrigerant in the previously mentioned intermediate indirect heat exchange step. Preferably in one or both the steps where the liquid of higher boiling component is used as refrigerant only a proportion is used as refrigerant, and another portion of the higher boiling component by-passes the heat exchanger and rejoins the other portion downstream of the heat exchanger. In this way the higher-boiling component downstream of each heat exchanger is cooled by direct heat exchange, and when compression of the combined streams for delivery of the higher-boiling component as high pressure gas is desired, less pressure is required because the temperature is lower.

The liquid from the second separator vessel when being used as a refrigerant in the second heat exchange step must boil under a reduced pressure so that the vapors have to be compressed before being fed back to the first separator vessel. After compression the compressed vapors may be cooled, preferably in the heat exchanger of the previously described intermediate indirect heat exchange step. If desired after this cooling further compression may take place and the compressed vapors may be cooled again, preferably in the same intermediate heat exchanger.

The liquid from the second separator vessel after evaporating when acting as refrigerant and after being compressed may be divided into two streams, the first stream being liquefied and thereafter mixed with the second stream, the combined streams being fed to the first separator vessel. The liquefaction of the first stream preferably takes place in the heat exchanger of the first indirect heat exchange step. Preferably, in addition, only part of the liquid from the second separator vessel is used as refrigerant in the second indirect heat exchange step.

The other part of this liquid is mixed directly with the other streams being fed to the first separator vessel. The mixing of the three streams promotes their mutual direct heat exchange and in this way improves the establishment of phase equilibrium in the first separator vessel.

The component of lower boiling point obtained as a gas from the second separator vessel may be further purified. To purify the gas especially when it is helium, it may be passed through a bed of dry absorbent initially at a low temperature. Impurities, i.e., nitrogen in the case of helium, are retained within the bed. The bed can be regenerated, and after its regeneration it can be cooled down once more by passing therethrough the purified lower boiling component.

The lower boiling component after purification can be compressed and aftercooled and then delivered as compressed gas.

The process of this invention is eminently suitable for the recovery of helium from nitrogen, and due mainly to the fact that the liquid from the second separator vessel is fed back to the first separator vessel it is possible to obtain a 225-fold enrichment of helium in the gas phase in only two stages, and still have a recovery of helium of 95%.

Furthermore, this process delivers higher boiling gaseous component, e.g., nitrogen, at a low temperature, and hence if desired this gas can be used as a gaseous refrigerant in other processes where refrigeration is required.

The invention is now described with reference to the following example which is illustrated in the accompanying drawings which show in FIGURES 1 and 2 a flow sheet drawing of a method of separating helium from nitrogen.

Referring to FIG. 1 of the drawings, the raw gas, nitrogen with 0.43% helium, enters line 10 at 28 ata., −151.1° C., i.e., at saturation. In heat exchanger A it is condensed and cooled down to −158.5° C. The liquid is flashed to 10.1 ata. in throttle valve 11, mixed with a number of other partially liquefied streams and introduced in the first separator vessel X. Here, at 10.1 ata., a gas containing 2.154% helium is separated from the liquid containing 0.0207% of helium, both phases being at −169.3° C.

The enriched gas leaving the first separator in line 30 is compressed by compressor 1 in one state to 28 ata. It leaves the compressor in line 31 at −124.7° C. and is cooled to −151.7° C. by indirect heat exchange with cold gaseous depleted nitrogen in intermediate heat exchanger C. It then condenses partially in heat exchanger A, from which it emerges at −169.3° C. only 8.82% gaseous state. In heat exchanger B further condensation is effected so that the material leaving it is at 26 ata., −199.2° C. and is only 1.79% in the gaseous phase. It is then fed into the second separator vessel Y where at 26 ata., a gas containing 96.77% of helium is separated from a liquid containing 0.43% of helium: which liquid has exactly the same composition as the original feedgas. Both phases are still at −199.2° C.

The liquid from the second separator vessel Y in line 12 returns to the first vessel X but does so along three different paths. 50% of the liquid branches off at 13 and goes directly via line 14 to the first vessel by way of a throttle valve 15 which reduces the pressure to 10.1 ata. The other 50% in line 16 enters heat exchanger B through another throttle valve 17. In the heat exchanger B the liquid boils under a pressure of 0.365 ata., at −203.2° C., thus cooling the incoming material. Then the gas is recompressed to 10.5 ata. in two stages with intercooling. Compressor 2 takes the pressure up to 3.8 ata. and the temperature to −108.2° C. Leaving the compressor 2 in line 17 the gas is intercooled against gaseous nitrogen in heat exchanger C and its temperature is reduced to −158.5° C. Then the compressor 3 raises the pressure to 10.5 ata. and the temperature to −109.2° C.

Leaving compressor 3 in line 18 the gas is aftercooled in heat exchanger C and the temperature reduced to the same value as above. This gas stream again splits in two at 19. About 67%, governed by a control valve 20, goes straight to the first separator vessel X. The remainder in line 32 at −158.5° C. is liquefied in heat exchanger A before it enters separator vessel X.

The liquid from the first separator vessel X in line 33 is the depleted nitrogen, and leaves the installation along three different paths, but first all the liquid is boosted to 15 ata. pressure by a liquid pump 21. Most of it (some 92%) passing through line 22a evaporates at −162.5° C. in heat exchanger A and thus provides refrigeration for the three condensing gas streams. 47% of the cold gas coming from the heat exchanger A in line 22b is taken in line 23a through heat exchanger C where it heats up to −125.2° C. At this point the remaining 53% cold gas in line 22b, and in line 24 about 8% of the liquid nitrogen which did not pass through heat exchanger A, both flowing through control valves 25 and 26 respectively, mix with the warmer gas in line 23b. The recombined material in line 27 enters the compressor 4 at 14.5 ata., −154.7° C. The compressor takes the pressure up to 28 ata. in one stage. The nitrogen leaves the installation in line 28 at −126.7° C.

The raw helium (96.77%) which leaves the second separator vessel Y in line 40 at 26 ata., −199.2° C., enters bed M of 5 A. molecular sieve which is at −163.2° C. The nitrogen is retained within the bed and pure helium is produced at the other end. This pure helium also is at −163.2° C. About 38.5% of this cold gas passing through line 41 is carried through the bed N. This bed has been regenerated at 26.7° C. and is now cooled down to −163.2° C. by the cold gas. This gas leaves the bed N in line 42 at 26.7° C. and joins the remaining 61.5% of the cold gas which has passed through a control valve 43 in line 44. The recombined gas stream in line 45 enters the helium compressor 5 at 24 ata., −90.2° C. and is discharged at 140 ata., +148.8° C. It finally flows through line 46 to air-cooler D which takes the temperature down to 50° C. The gas passing through line 47 is now delivered ready for bottling.

Referring also to FIG. 2 of the drawings, while the adsorbent bed M is in actual operation and bed N is being cooled down, as described above, the bed L is regenerated. To achieve this, it is connected to a nitrogen purging loop in which the blower 6 circulates nitrogen in line 50 at a pressure of 1.5 ata. An air heat exchanger E heats the gas, which is cold at first, to ambient temperature. The nitrogen which is desorbed from the bed L during this "high" temperature purging tends to raise the pressure in the loop. The pressure controlled valve 51 on top of the suction drum F releases this nitrogen to the atmosphere. After this purging has taken place for a sufficiently long time, the bed is disconnected at valves 52 and 53 from the loop and evacuated to a pressure of about 0.25 ata., to remove as much as reasonably possible of the remaining nitrogen. After flushing the bed shortly with a small amount of raw helium at this low pressure, it is ready to be cooled down in the place of bed N. The process can be designed so that each of the three beds go through a complete cycle of operations in three days: 1 day adsorbing, 1 day cooling, and 1 day regenerating.

I claim:
1. A process for the separation of a gaseous feed mixture into two components, said mixture being available at a low temperature and at an elevated pressure and the two components having widely different boiling points, comprising
    (a) at least partially condensing the feed mixture in a first indirect heat exchange step,
    (b) separating said mixture in a first separator vessel into a liquid phase and a gaseous phase enriched in the component having the lower boiling point,

(c) compressing the gas from said first separator vessel, (d) at least partially condensing said gas in a second indirect heat exchange step, (e) separating the gas from step (d) in a second separator vessel into a liquid component and a gaseous component which is almost entirely composed of the lower boiling point component, (f) using the liquid from the second separator vessel as refrigerant in said second indirect heat exchange step (d) causing said refrigerant to vaporize.

(g) thereafter compressing the vaporized refrigerant from step (f) and feeding it back to the first separator vessel, using the liquid from the first separator vessel as refrigerant in said first indirect heat exchange step, (h) and removing the gaseous component from the second separator step as product.

2. A process as claimed in claim 1, in which the feed mixture is completely condensed in the first indirect heat exchange step including the further step of thereafter expanding said condensed vapor mixture prior to phase separation in the first separator vessel.

3. A process as claimed in claim 1, in which the lower boiling point component is purified by passing it through a bed of dry adsorbent initially at a low temperature.

4. A process as claimed in claim 3 in which the bed is subsequently cooled down after its regeneration by passing therethrough purified lower boiling point component.

5. A process as claimed in claim 1 in which the difference in boiling points of the two components is at least 50° C.

6. A process as claimed in claim 1 in which the gaseous feed mixture is in the saturated condition.

7. A process for the separation of a gaseous feed mixture into two components said mixture being available at a low temperature and at an elevated pressure and the two components having widely different boiling points in which the feed mixture is at least partially condensed in a first indirect heat exchange step and phase separated in a first separator vessel, compressing the gas from the first separator vessel, at least partially condensing said compressed gas in a second indirect heat exchange step and passing the gas and the condensate liquid to a second separator, withdrawing liquid from the second separator vessel and using said liquid as refrigerant in said second indirect heat exchange step to vaporize the said liquid, compressing the vaporized refrigerant and feeding it back to the first separator vessel, withdrawing a higher boiling liquid from the first separator vessel and using said higher boiling liquid as refrigerant in said first indirect heat exchange step and recovering lower boiling component as a gas from the second separator vessel.

References Cited

UNITED STATES PATENTS

| 1,850,529 | 3/1932 | Bottoms | 62—27 |
| 2,274,094 | 2/1942 | Rupp | 62—23 X |
| 3,254,496 | 6/1966 | Roche et al. | 62—23 X |

NORMAN YUDKOFF, *Primary Examiner.*

V. W. PRETKA, *Assistant Examiner.*